United States Patent [19]

Abe et al.

[11] Patent Number: 5,197,181
[45] Date of Patent: Mar. 30, 1993

[54] MOTOR POSITIONING METHOD

[75] Inventors: Yohji Abe, Kiyose; Takahiro Sakaguchi, Kodaira; Daihachiro Takasu, Niiza; Hiroshi Sugahara, Tokyo, all of Japan

[73] Assignee: TEAC Corporation, Japan

[21] Appl. No.: 879,743

[22] Filed: May 6, 1992

[30] Foreign Application Priority Data

May 8, 1991 [JP] Japan .................................. 3-102787

[51] Int. Cl.$^5$ ........................................... H02K 15/14
[52] U.S. Cl. ...................................... 29/596; 29/467; 29/732
[58] Field of Search .................. 29/596, 603, 732, 467

[56] References Cited

FOREIGN PATENT DOCUMENTS 2-42254 9/1988 Japan .

Primary Examiner—Carl E. Hall
Attorney, Agent, or Firm—Andrus, Sceales, Starke & Sawall

[57] ABSTRACT

A motor positioning method includes steps of: providing a frame of a disk drive apparatus having locating holes spaced apart from each other, the locating holes being located in accordance with a predetermined positional relationship between the locating holes and a target position; placing a positioning jig on a base surface, the positioning jig having a first connecting portion with a diameter corresponding to a reference opening at the target position and second connecting portions with diameters corresponding to respective ones of the locating holes, the second connecting portions and the first connecting portion being located in accordance with the positional relationship; placing the frame onto the positioning jig so that the second connecting portions are fitted into the locating holes; and placing a board having a drive motor, a shaft and the reference opening at the target position, onto the frame attached to the jig so that the first connecting portion is fitted into the reference opening, thus positioning the shaft at the target position within the apparatus.

10 Claims, 9 Drawing Sheets

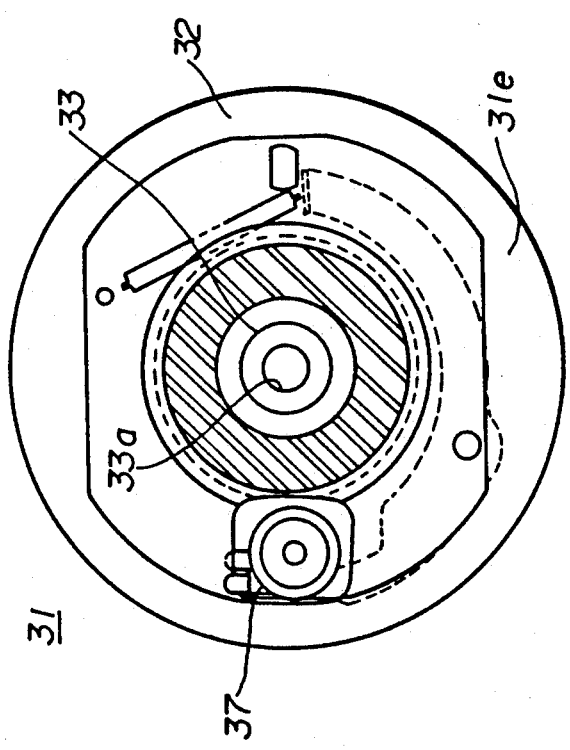

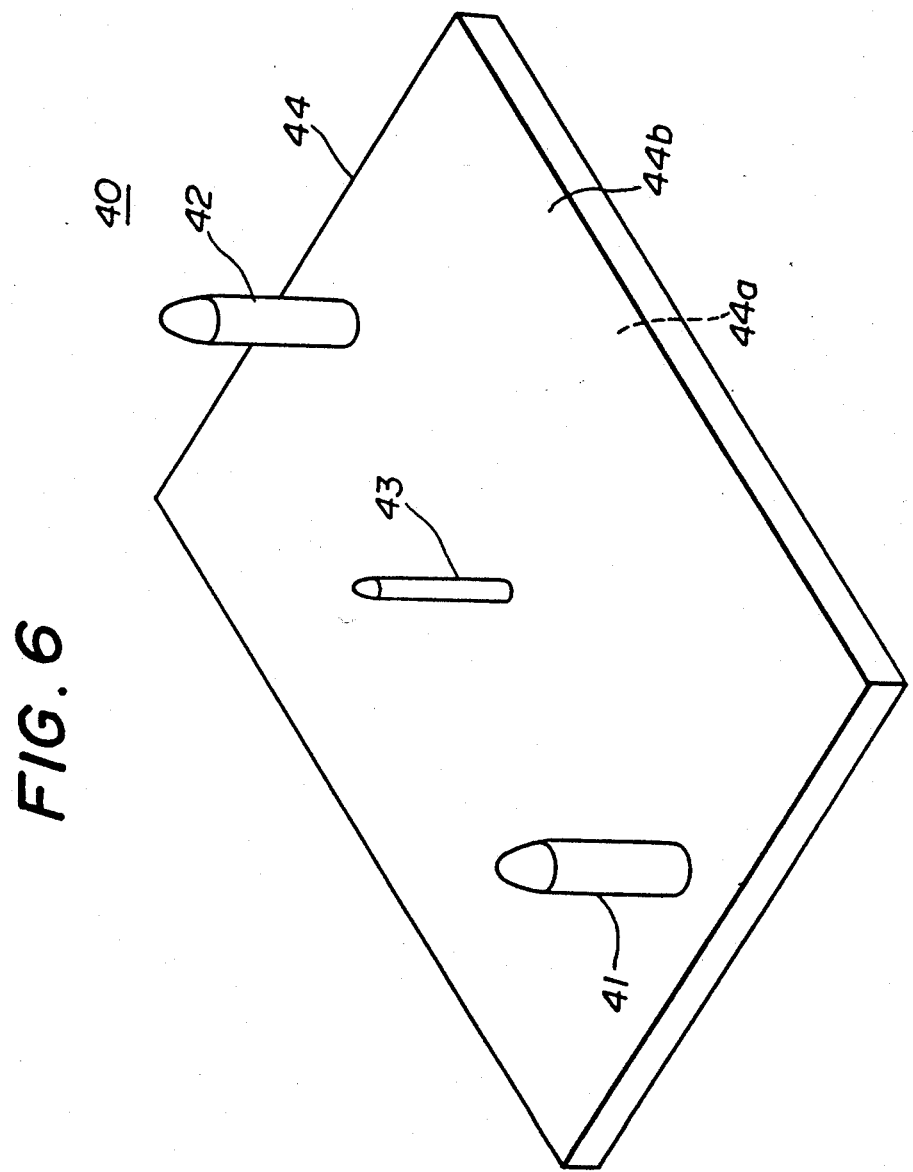

MOTOR POSITIONING METHOD

BACKGROUND OF THE INVENTION (1) Field of the Invention

The present invention generally relates to a motor positioning method, and more particularly to a method of positioning a shaft of a drive motor in a frame of a disk drive apparatus by means of a positioning jig.

(2) Description of the Prior Art

Conventionally, it is necessary that a drive motor unit is correctly positioned in a disk drive apparatus. FIG. 1 shows such a conventional positioning process by which a drive motor unit 10 is attached to and positioned in relation to a frame 1 of a disk drive apparatus. Generally, a magnetic disk (not shown) placed in the disk drive apparatus is rotated by a drive motor of the attached drive motor unit 10 around a shaft of the drive motor. In FIG. 1, the drive motor unit 10 attached to the frame 1 has a rotor part and a stator part. The rotor part of the unit 10 includes a drive motor 2, a table 3 rotated by the motor 2 and a spindle shaft 4 around which the table 3 is rotated. The drive motor 2 has a motor body 2a. The stator part of the unit 10 is fixed to the frame 1 and includes a stepped flange 5 and a printed circuit board 6. A motor coil, other electronic parts and connecting lines are printed in the printed circuit board 6.

The frame 1 of the disk drive apparatus has an opening 1a in a center portion thereof. The stepped flange 5 of the unit 10 is placed from a lower position into a bottom surface of the frame 1 in a direction indicated by an arrow A in FIG. 1, and the flange 5 is fitted in the opening 1a of the frame 1. Thus, positioning of the unit 10 in relation to the frame 1 must be carried out. After such a positioning is carried out, the drive motor unit 10 is secured to the frame 1 of the disk drive apparatus by means of suitable screws (not shown).

Generally, it is necessary to accurately locate the shaft 4 of the attached unit 10 in relation to the frame 1, because the shaft 4 is the center of rotation around which a disk (not shown) inserted in the disk drive apparatus is rotated. However, the drive motor unit 10 has bearings and other parts radially interposed between the shaft 4 and the flange 5. In some cases, the interposing parts may have machining deviations or positional errors in the drive motor unit 10, the spindle shaft 4 thereby having a deviation or a positional error in relation to the frame 1 of the disk drive assembly.

Therefore, when the above mentioned positioning method is carried out, there is a problem in that the shaft 4 of the unit 10 is not accurately positioned in direct relation to the frame 1, thus the actual center of rotation for rotating the inserted disk around the shaft 4 may deviate from a correct position within the disk drive apparatus due to the positional errors of the interposing parts in the unit 10. Such a problem may arise when the disk drive apparatus carries out processes of reading and writing information from and to the disk placed in the disk drive apparatus.

SUMMARY OF THE INVENTION

Accordingly, it is a general object of the present invention to provide an improved motor positioning method in which the above described problems are eliminated.

Another and more specific object of the present invention is to provide a motor positioning method by which the shaft of the attached drive motor is accurately positioned in relation to the frame of the disk drive apparatus, thus improving the accuracy of the positioning of the shaft of the drive motor in the disk drive apparatus. The above mentioned object of the present invention is achieved by a motor positioning method including steps of providing a frame of a disk drive apparatus having a plurality of locating holes spaced apart from each other, the locating holes being located within the frame in accordance with a predetermined positional relationship between the locating holes and a target position for locating a shaft of a drive motor in the frame; placing a positioning jig on a base surface, the positioning jig including a first connecting portion with a diameter corresponding to a reference opening and a plurality of second connecting portions with diameters corresponding to the respective locating holes, the second connecting portions and the first connecting portion being located within the above positioning jig in accordance with the positional relationship; placing the frame onto the positioning jig so that the second connecting portions are fitted into the locating holes; and placing a board having the drive motor, the shaft and the reference opening located at the target position, onto the frame attached to the positioning jig so that the first connecting portion is fitted into the reference opening, thus accurately positioning the shaft at the target position in relation to the frame. According to the present invention, it is possible to easily place the board of the drive motor onto the frame of the disk drive apparatus, by making use of the positioning jig. Also, it is possible to accurately position the shaft of the drive motor in relation to the frame by fitting the locating pins of the positioning jig to the locating holes and the reference opening. Thus, the accuracy of the position of the shaft in relation to the frame is remarkably improved when compared with that of the conventional method.

Other objects and further features of the present invention will become apparent from the following detailed description when read in conjunction with the accompanying drawings.

BRIEF DESCRIPTION OF THE DRAWINGS

FIG. 5A is a view showing the board carrying the drive motor shown in FIG. 4.

FIG. 6 is a perspective view showing a positioning jig of FIG. 2;

DESCRIPTION OF THE PREFERRED EMBODIMENT

Figure 1:
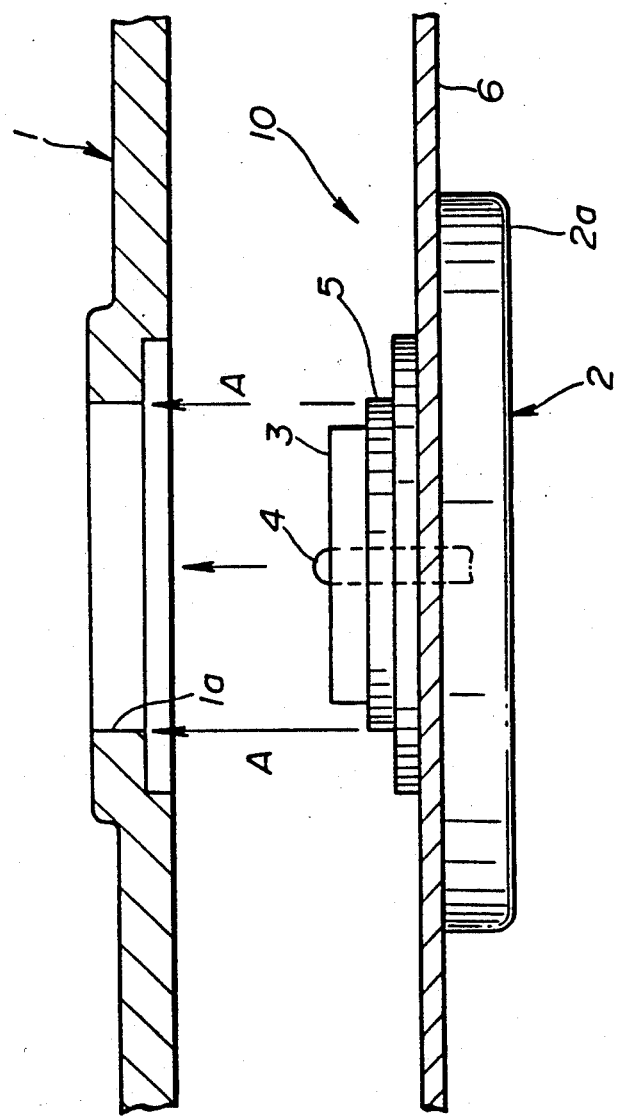
FIG. 1 is a view showing a frame of a disk drive apparatus to which a board of a drive motor is attached and positioned by a conventional method.
Figure 2:
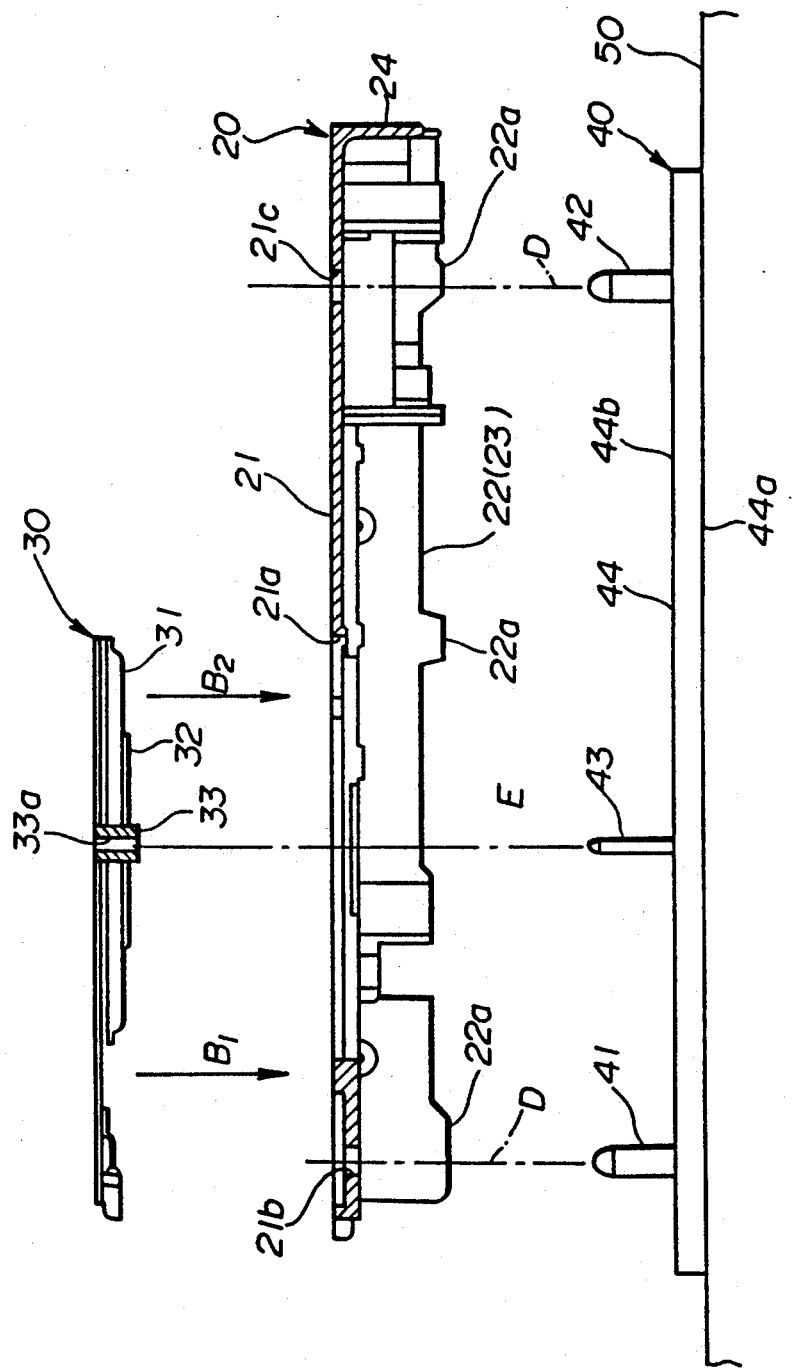
FIG. 2 is a view for explaining a motor positioning method according to the present invention.

A description will now be given of a frame of a disk drive apparatus and a board of a drive motor by referring to FIG. 2. In FIG. 2, a frame 20 is a main part in which a disk drive apparatus is accommodated, and a board 30 is a printed circuit board in which a drive motor 31, a table 32, and a spindle shaft 33 are provided. The board 30 is placed onto a bottom surface 21 of the frame 20 in a direction indicated by arrows B1 and B2 in FIG. 2, and positioning of the shaft 33 of the board 30 in relation to the frame 20 is carried out by making use of a positioning jig 40. It should be noted that both the frame 20 and the board 30 are shown in FIG. 2 as being placed upside down on the positioning jig, and the bottom surface 21 is shown as being located atop the frame 20. The positioning jig 40 is used for accurately and easily positioning the shaft 33 of the board 30 in relation to the frame 20 of the disk drive apparatus. If the board 30 is correctly positioned in the frame 20, it is possible for the drive motor 31 to reliably and accurately rotate a disk (not shown) around the shaft 33, the disk being accommodated in a disk cartridge (not shown) placed in the disk drive apparatus.

Figure 3:
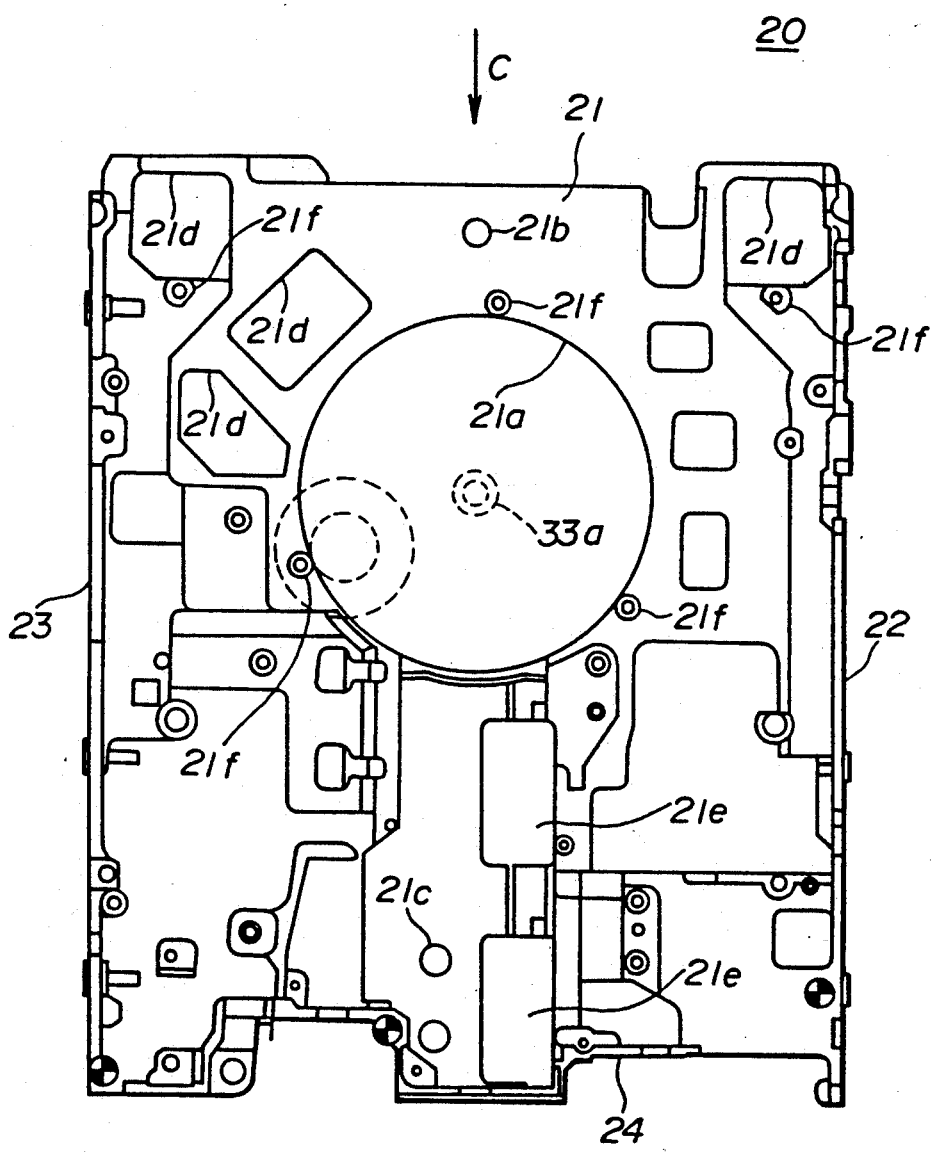
FIG. 3 is a plan view showing a frame of the disk drive apparatus shown in FIG. 2.

FIG. 3 shows a detailed structure of the frame 20 of FIG. 2. The frame 20 is a one-piece base board made of aluminum, this base board being formed through aluminum die casting, and machining work such as grinding of the base board at portions of the frame 20 requiring accurate dimensions is conducted. As shown in FIG. 3, the frame 20 has an approximately rectangular shape, and it comprises the bottom surface 21, two side faces 22, 23, and a rear face 24. The frame 20 has an opening portion on a front face thereof, and this opening portion is provided for allowing a disk cartridge (not shown) having a disk (not shown) to be inserted into the disk drive apparatus in a direction indicated by an arrow C in FIG. 3.

A circular opening 21a is formed in an approximately centered portion between the side faces, near the front face of the bottom surface 21 of the frame 20. The drive motor 31 of the board 30 of FIG. 2 is placed into this circular opening 21a. Also, two locating holes 21b and 21c are formed in the bottom surface 21 along the center line of the frame 20. As described below, two locating pins of the positioning jig 40 are inserted in these locating holes 21b and 21c. Some portions of the frame 20 requiring accurate dimensions as mentioned above are machined in accordance with reference positions determined by these locating holes 21b and 21c.

Five threaded holes 21f are formed in the bottom surface 21 of the frame 20 for securing the board 30 to the frame 20, three of them located at peripheral portions of the circular opening 21a, and the others located at two corner portions of the frame 20. Also, several opening portions 21d are formed in the bottom surface 21 of the frame 20, and the corresponding electronic parts in the board 30 are placed into the opening portions 21d. Moreover, carriage mounting portions 21e are formed in the bottom surface 21 of the frame 20, and these portions 21e are located along an insertion line (in a direction indicated by an arrow C in FIG. 3) for mounting a head carriage unit (not shown) on the portions 21e.

In the side faces 22 and 23 of the frame 20, a disk cartridge mechanism (not shown) is provided for automatically setting a disk of a disk cartridge to the table 32 of the board 30. In the rear face 24 of the frame 20, groove portions and threaded holes are formed for mounting a stepping motor (not shown) on the frame 20.

Figure 4:
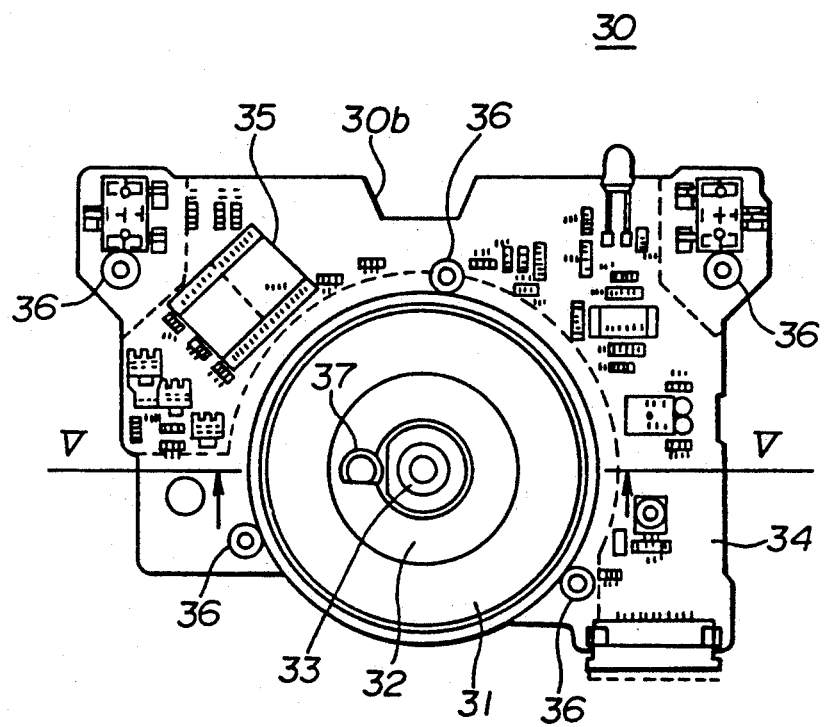
FIG. 4 is a plan view showing a board carrying a drive motor shown in FIG. 2.

FIG. 4 shows a detailed structure of the board 30 carrying the drive motor 31 and other electronic parts shown in FIG. 2. The board 30 is a thin printed circuit board made from, for example, a laminated sheet having a dielectric layer covering a thin iron board. The drive motor 31, other electronic parts and conductive interconnecting lines are printed on the dielectric layer in the board 30.

In a main part 34 of the board 30, five through holes 36 are formed at portions corresponding to the above threaded holes 21f of the frame 20, and mounting screws (not shown) for securing the board 30 to the frame 20 are inserted into the through holes 36 and firmly attached to the respective threaded holes 21f of the frame 20. The through holes 36 each have a diameter slightly greater than that of each of the screws for securing the board 30 to the frame 20. Also, a cut-out opening 30b is formed in the main part 34 at a position corresponding to the above locating hole 21b of the frame 20. This cut-out opening 30b is formed so as to cause no interference between the locating pin 41 of the jig 40 and the board 30 when the frame 20 and the board 30 are mounted on the positioning jig 40.

Figure 5B:
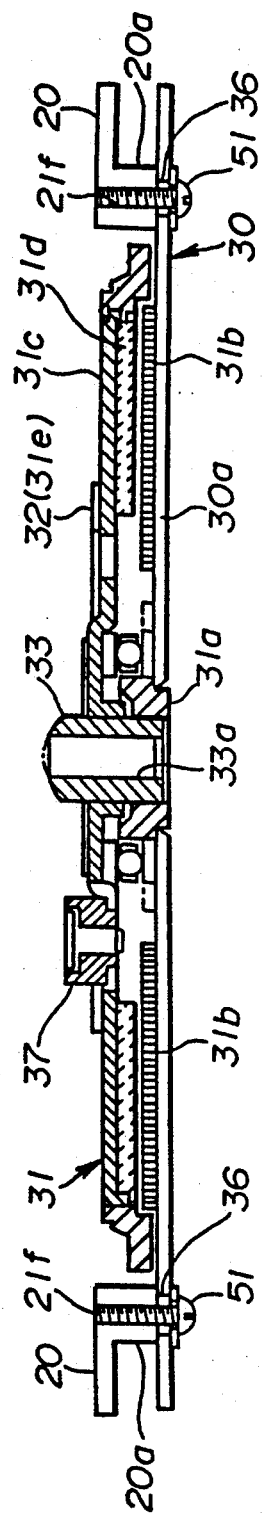
FIG. 5B is a sectional view taken along a line V—V in FIG. 4.

FIG. 5A shows the drive motor 31 with the table 32 in the board 30 shown in FIG. 4, and FIG. 5B is a sectional view of the board 30 taken along a line V—V in FIG. 4. In FIG. 5B, the board 30 is secured to the frame 20. The drive motor 31 has a rotor part and a stator part. As shown in FIG. 5B, the stator part of the drive motor 31 is formed by a bearing 31a supporting the spindle shaft 33 and by motor coils 31b arranged on the main part 34 of the drive motor 31. The rotor part is formed by a rotor case 31c secured to the spindle shaft 33 and by magnets 31d fixed to the surface of the rotor case 31c. The magnets 31d are arranged separately from the motor coils 31b and opposite thereto. The spindle shaft 33 has a semispherical head portion and a hollow portion axially extending along the center axis of the shaft 33. As shown in FIG. 2, this hollow portion of the spindle shaft 33 is a locating hole 33a into which a locating pin 43 of the positioning jig 40 is fitted. The locating hole 33a is not a through hole, and has a diameter almost equal to the diameter of the locating pin 43, thereby preventing clogging of foreign matter in the locating hole 33a.

When a disk drive apparatus is manufactured, it is necessary to inspect the surface of the rotor case 31c secured to the spindle shaft 33 and to inspect the circumferential edge of the rotor case 31c for runout thereof. However, in a case of a thin-type disk drive apparatus, it is difficult to correctly inspect for the runout because the apparatus has a small height. According to the present invention, the locating hole 33a inside the shaft 33 is useful to facilitate such inspection work. That is, the inspection work regarding the above runout can easily be carried out by inserting a locating pin into the locating hole 33a and rotating the rotor part of the board 30 around the shaft 33.

A magnet 31e is provided on a top surface of the table 32 coaxially with the spindle shaft 33 in order to magnetically fix a hub of a disk placed in the disk drive apparatus. Also, a drive pin 37 is provided on the board 30 so that the drive pin 37 is inserted into an opening provided on the disk for this purpose abd the pin 37 thus serves to rotate the disk around the spindle shaft 33.

FIG. 6 shows a detailed structure of the positioning jig 40 of FIG. 2. In FIG. 6, the positioning jig 40 has a metal base plate 44 on which the two locating pins 41, 42 and the locating pin 43 are provided. The base plate 44 has a top surface 44b and a bottom surface 44a. The locating pins 41, 42 and 43 are firmly secured to the metal base plate 44, and they are placed vertically in relation to the bottom surface 44a of the base plate 44. The locating pin 43 is a first connecting part of the present invention. The pin 43 has an outside diameter such that the pin 43 is snugly fitted in the locating hole 33a of the shaft 33. The locating pins 41 and 42 are second connecting parts of the present invention; each of them has an outside diameter such that the pins 41 and 42 are snugly fitted in the locating holes 21b and 21c of the frame 20, respectively.

The locating pins 41 and 42 are located on the base plate 44 at portions of the positioning jig 40 corresponding to the locating holes 21b and 21c of the frame 20 of FIG. 3. The locating pin 43 is located on the base plate 44 at a portion corresponding to a target position of the shaft 33a (indicated by a dotted line in FIG. 3) of the frame 20. A positional relationship between the locating pins 41, 42 and 43 of the positioning jig 40 is predetermined. This relationship is in accordance with a positional relationship between the locating holes 21b, 21c (of the frame 20) and the locating hole 33a (of the board 30 attached to the frame 20). In addition, the locating pins 41, 42 and 43 each have a rounded leading edge, allowing the locating pins to easily and smoothly be fitted into the locating holes 21b, 21c and 33a. The above is useful for achiving accurate positioning of the board 30 in relation to the frame 20.

Next, a description will be given of a positioning method of the present invention by which the board 30, carrying the drive motor 31, is positioned in relation to the frame 20.

First, as shown in FIG. 2, the positioning jig 40 is placed on a flat base 50 so that the locating pins 41, 42 and 43 stand vertically in relation to the bottom surface of the base 50. The frame 20 is placed over the positioning jig 40 in such a manner that the top surface of the frame 20 of FIG. 3 faces the top surface 44b of the positioning jig 40. The frame 20 is then lowered as indicated by dotted chain lines D in FIG. 2 so that the locating pins 41 and 42 of the positioning jig 40 are fitted into the locating holes 21b and 21c of the frame 20. When the frame 20 is thus attached to the positioning jig 40, a plurality of end portions 22a of the side faces 22 and 23 of the frame 20 come into contact with the base 50. The frame 20 stands stably on the base 50 in a horizontal position, and the bottom surface 21 of the frame 20 is placed in a horizontal position parallel to the base 50. The locating pin 43 of the positioning jig 40 in this condition passes through the opening portion 21a of the frame 20. It should be noted that the frame 20 of FIG. 2 is placed upside down, and that hence the upper end portions 22a of the frame 20 are shown, in the figure, as being located at the bottom thereof.

The board 30 is placed over the frame 20 in such a manner that the drive motor 31 of the board 30 faces the surface 21 of the frame 20 as shown in FIG. 2. The board 30 is then lowered onto the frame 20, and the positions of the through holes 36 of the board 30 are matched with those of the threaded holes 21f of the frame 20. In this condition, the locating pin 43 of the positioning jig 40 is fitted into the locating hole 33a of the shaft 33 of the board 30 as indicated by a dotted chain line E in FIG. 2.

Figure 7:
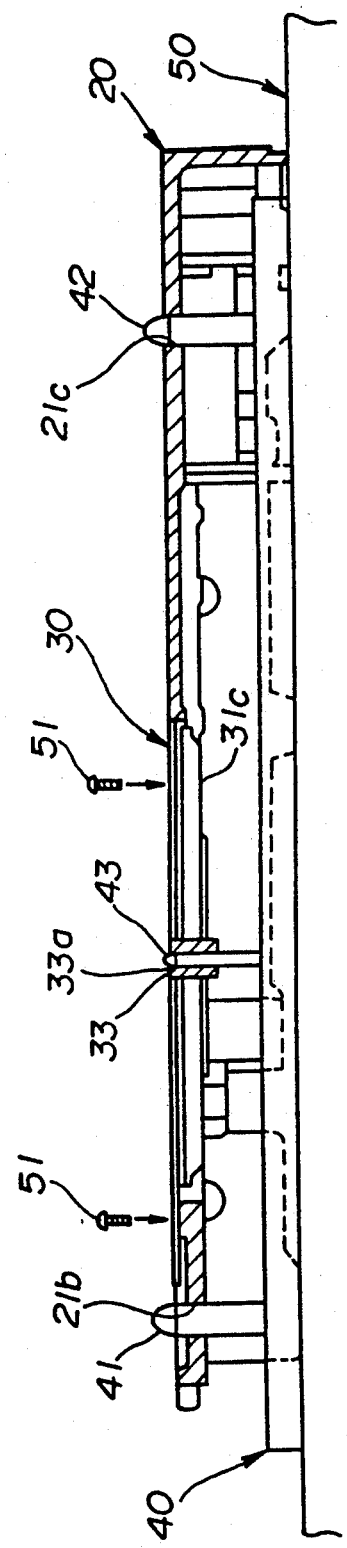
FIG. 7 is a sectional view showing the drive motor board and the frame mounted together on the positioning jig.

FIG. 7 shows the frame 20 and the board 30 mounted together on the positioning jig 40 in accordance with the above described positioning method. As described above, the locating pins 41, 42 and 43 of the positioning jig 40 have a predetermined positional relationship therebetween. When the locating pins 41 and 42 of the jig 40 are fitted into the locating holes 21b and 21c of the frame 20 so that the frame 20 is fixed on the jig 40, the locating pin 43 is already placed at a correct target position in relation to the frame 20. After the locating pin 43 is fitted into the locating hole 33a of the board 30, the spindle shaft 33 of the board 30 is positioned at the correct target position in relation to the frame 20.

Figure 8:
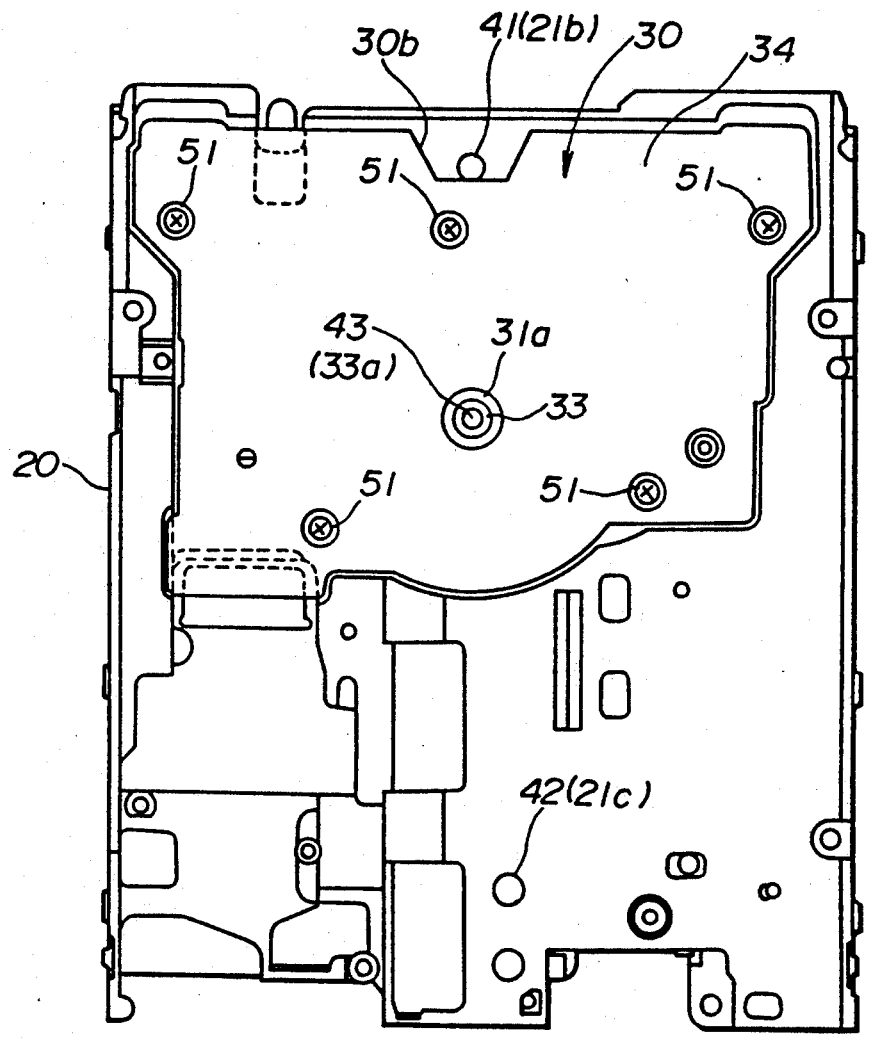
FIG. 8 is a plan view showing the drive motor board secured to the frame using mounting screws.

As shown in FIG. 7, mounting screws 51 are inserted into the through holes 36 of the board 30, and are then firmly attached to the respective threaded holes 21f of the frame 20, so that the board 30 is secured to the frame 20. As described above, the through holes 36 each have a diameter slightly greater than the outside diameter of the mounting screws 51, and the position of the board 30 in relation to the frame 20 can be adjusted to an extent as allowed by the screws 51 loosely fitted into the holes 36. After the position of the board 30 is adjusted, the mounting screws are tightened in the threaded holes 21f so that the board 30 is firmly secured to the frame 20. FIG. 8 shows the board 30 secured to the frame 20 by tightening the mounting screws.

Finally, the frame 20 and the board 30 secured thereto are removed from the positioning jig 40. In the frame 20, removed from the jig 40, the drive motor 31 of the board 30 is secured, and the shaft 33 of the board 30 is correctly positioned at a target position in relation to the frame 20. Thus, according to the above described motor positioning method, it is possible to easily place the board 30 onto the frame 20 by making use of the positioning jig 40. Also, it is possible to accurately position the shaft 33 of the drive motor 31, in relation to the frame 20, by placing the locating oins 41, 42 and 43 of the positioning jig 40 into the locating holes 21b, 21c and 33a. Hence, the accuracy of the positioning of the shaft 33 in relation to the frame 20 is remarkably improved when compared with the accuracy of the conventional method.

Figure 9:
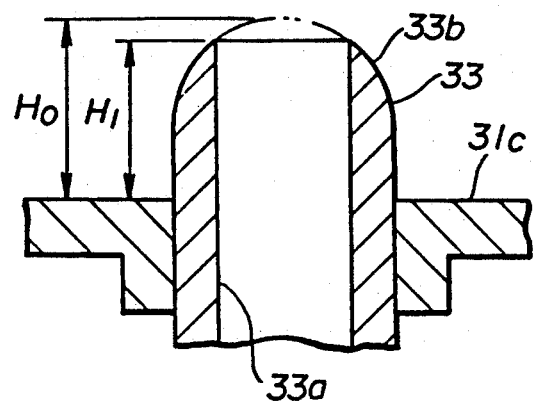
FIG. 9 is an enlarged view showing a spindle shaft of the board of FIG. 4.

FIG. 9 shows a detailed structure of the spindle shaft 33 of FIG. 4. In a conventional drive motor board, a leading edge of a spindle shaft has a semispherical shape, as indicated by a two-dot chain line in FIG. 9. The spindle shaft having such a shape can easily and smoothly be inserted into a machine-tool chuck. Recently, it has become desirable to produce and use a thin-type disk drive apparatus. In the drive motor board shown in FIG. 4, an edge of the shaft 33 has such a cross section as indicated by a solid line of FIG. 9. As shown in FIG. 9, the shaft 33 has the axially extending reference opening 33a provided inside the shaft 33, and an exterior sloping portion 33b merging into a flat top surface at the end of the inside opening 33a. It should be noted that a height H1 of the shaft 33 above the surface of the rotor case 31c is smaller, in the present embodiment, than a height H2 of the semispherical shaft in the conventional case; this feature is useful for producing a thin-type disk drive apparatus with low cost. It should also be noted that the shaft 33, which has a vertically trapezoidal cross-section and the axially extending opening, can be produced by simply boring the inside of the shaft 33 in axial direction thereof, and that the reference opening 33a is thereby formed inside the shaft 33.

In the above described embodiment, the frame 20 has the locating holes 21b and 21c and the board 30 has the reference opening 33a while the positioning jig 40 has the locating pins 41, 42 and 43. However, the present invention is not limited to this embodiment. It is possible to make a modification of the present invention such that, conversely, the frame 20 and the board 30 includes locating pins and the positioning jig includes reference openings corresponding to the locating pins. It is also possible that another suitable connecting means is used instead of the above described locating holes and pins.

As described above, according to the present invention, it is possible to easily place the board 30 onto the frame 20 of the disk drive apparatus by making use of the positioning jig 40. Also, it is possible to accurately position the shaft 33 of the drive motor 31 in relation to the frame 20 by connecting the locating pins 41, 42 and 43 of the positioning jig 40 to the locating holes 21b, 21c and 33a. Hence, the accuracy of the position of the shaft 33 in relation to the frame 20 is improved remarkably when compared with the accuracy of the conventional method.

It should be noted that it is possible to easily produce a drive motor board with a shaft having a height smaller than that of the conventional case by boring an internal portion of the shaft in an axial direction thereof so as to form a reference opening. This is useful for producing a thin-type disk drive apparatus at low cost. It should also be noted that the reference opening provided inside the shaft is useful for making easier inspection work for checking the rotor part of the drive motor for runout. Such inspection work can be performed by inserting a suitable pin into the reference opening and rotating the rotor part of the drive motor around the shaft. Therefore, the accuracy of the position of the drive motor mounted in the disk drive apparatus can be improved.

Further, the present invention is not limited to the above described embodiment, and variations and modifications may be made without departing from the scope of the present invention.

What is claimed is:

1. A method of positioning a shaft of a drive motor in a disk drive apparatus, said method comprising steps of:

providing the apparatus with a frame having a plurality of locating holes spaced apart from each other, said locating holes being located within the frame in accordance with a predetermined positional relationship between said locating holes and a desired target position of the shaft of the drive motor within the apparatus;

placing a positioning jig on a base surface, said positioning jig including a first connecting portion with a diameter corresponding to a reference opening, and a plurality of second connecting portions with diameters corresponding to respective ones of said locating holes, said second connecting portions and said first connecting portion being located within the positioning jig in accordance with said positional relationship;

placing said frame onto said positioning jig so that said second connecting portions are fitted into said locating holes; and placing said drive motor and said shaft with said reference opening at said target position, onto said frame attached to said positioning jig so that said first connecting portion is fitted into said reference opening, thus positioning said shaft at said target position within said apparatus.

2. A method according to claim 1, wherein said first and second connecting portions comprise at least three locating pins extending vertically from said positioning jig placed on said base surface, and said locating pins are located within said positioning jig in accordance with said predetermined positional relationship.

3. A method according to claim 1, further comprising a step of fixing a board having said drive motor and said shaft to said frame by means of mounting screws after said second placing step is carried out.

4. A method according to claim 1, wherein said frame includes a center opening into which the drive motor is fitted, said first connecting portion passing through said center opening when said second connecting portions are fitted into said locating holes, said positioning jig thus having no interference with said frame.

5. A method according to claim 1, wherein a leading edge of each of said first and second connecting portions of said positioning jig is rounded so that said first and second connecting portions are smoothly fitted into said reference opening and said locating holes.

6. A method according to claim 4, wherein said shaft has an axially extending hole provided inside said shaft as being the reference opening corresponding to said target position, said shaft being provided with a flat surface at a top end portion thereof and an exterior sloping portion merging into said flat surface, said flat surface being formed by forming said hole inside said shaft, thereby reducing a height of said board including said shaft.

7. A method according to claim 4, wherein said board includes a cut-out opening at a position corresponding to at least one of the second connecting portions of the positioning jig, said board thus having no interference with said positioning jig when said first connecting portion is fitted into said reference opening.

8. A method according to claim 3, further comprising a step of removing said board fixed to said frame from said positioning jig after said fixing step is carried out.

9. A method according to claim 3, wherein said board includes a plurality of through holes located at positions corresponding to said mounting screws, each of said through holes having a diameter slightly greater than a diameter of each of said mounting screws, and said frame includes a plurality of threaded holes located at positions corresponding to said mounting screws, each of said threaded holes having a diameter substantially equal to the diameter of each of said mounting screws.

10. A method according to claim 9, wherein said board is fixed to said frame by said mounting screws, said mounting screws passing through said through holes of said board and being tightened to said threaded holes of said frame, said mounting screws being located on said board at positions such that there is no interference with said first connecting portion of said positioning jig.

* * * * *